United States Patent Office 2,919,293
Patented Dec. 29, 1959

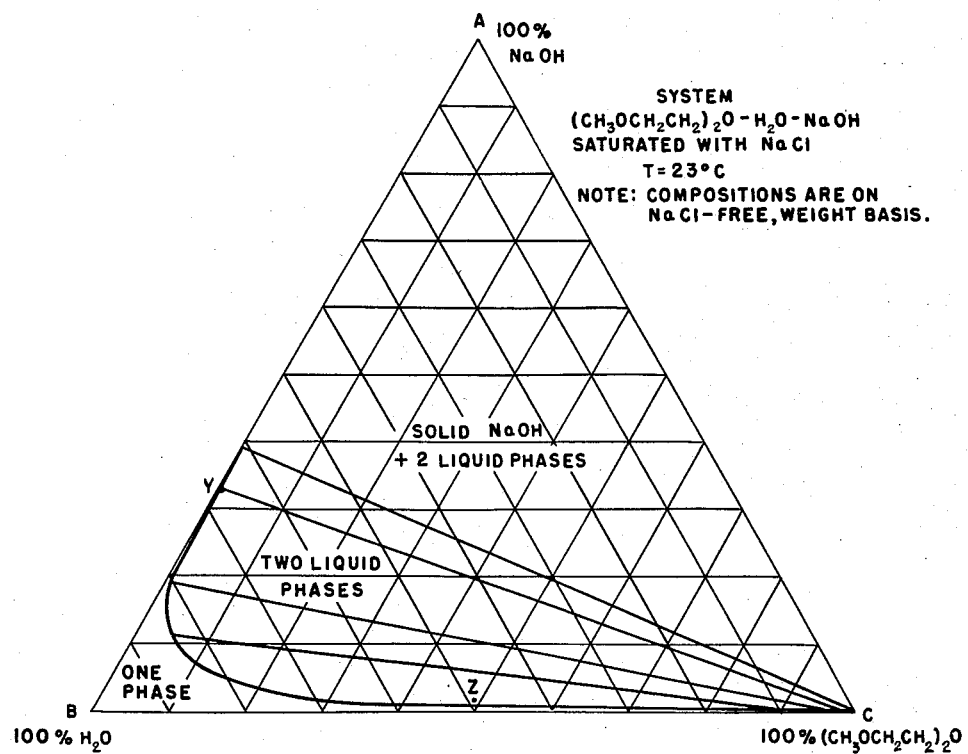
Guenter K. Weisse
INVENTOR.
BY
Adams, Forward and McLean
ATTORNEYS

2,919,293

SALTING OUT A DIALKYL ETHER OF DIETHYLENE GLYCOL FROM AN AQUEOUS SOLUTION

Guenter K. Weisse, Niagara Falls, N.Y., assignor to Olin Mathieson Chemical Corporation, a corporation of Virginia Application July 23, 1958, Serial No. 753,390

2 Claims. (Cl. 260—615)

This invention relates to the efficient separation of certain ethers from aqueous solutions thereof. More particularly it relates to the separation of diethylene glycol dialkyl ethers which have the generic formula $ROCH_2CH_2OCH_2CH_2OR'$ wherein R and R' are alkyl radicals containing one to three carbon atoms each, which ethers are either completely or highly soluble in water. This application is a continuation-in-part of my copending application Serial No. 581,188 filed April 27, 1956 and now abandoned.

These diglycol ethers are generally obtained in aqueous solution by reacting a saturated aliphatic monohydric alcohol containing one to three carbon atoms, such as methanol, ethanol, n-propanol or isopropanol, and the appropriate dichloro ether in the presence of an alkali metal hydroxide such as sodium hydroxide or potassium hydroxide. For example, bis-(2-methoxyethyl) ether can be made from bis-(2-chloroethyl) ether by treating it with methanol and alkali. If the reaction is performed with sodium hydroxide, two moles of sodium chloride and two moles of water will form for every mole of ether produced. The salt may be separated from the reaction mixture by centrifugation or filtration before the reaction mixture is distilled. It is not economical to decant the supernatant solution from the salt layer, as the latter is permeated throughout with the solution of the product.

The above-mentioned ethers form azeotropes with water and therefore cannot be isolated by simple fractional distillation. If fractionation is applied to remove the azeotrope from the reaction mixture, it must be a vacuum fractionation as the atmospheric boiling points of these ethers are high enough to cause side reactions between residual alkali and intermediate monochloroethers which are in solution in the reaction mixture. Under these conditions, low-boiling unsaturated ethers, such as methoxyethyl vinyl ether, are formed during the fractionation and distill with the product. To recover a pure product, a second fractionation must be made using an auxiliary component which forms an azeotrope with water at a relatively low temperature. Even with various combinations of such operations, the separation of the above ethers from water solution has heretofore been a complex and expensive procedure.

The main object of this invention is to provide an improved process for recovering the aforementioned diethers from water solution, which ethers can contain as little as one weight percent water or less.

A further object is to provide a step whereby an ether of the above-defined structure may be separated from aqueous solution as a liquid phase containing a low water content, preferably less than 10 to 15% by weight. Another object is to provide a separation process of improved efficiency for the recovery of an ether as above-described from an aqueous solution thereof. Other objects will be apparent from the following description.

The foregoing objects have been accomplished in accordance with this invention by causing the separation of the desired ether as a liquid layer of low water content, which layer readily yields the pure ether when subjected to fractional distillation. Such liquid phase separation has been found to be effected by substantially saturating the aqueous solution of the ether with sodium chloride, potassium chloride or other alkali metal chloride and adding an amount of an alkali metal hydroxide or alkali metal carbonate or mixture thereof, for example sodium hydroxide, potassium hydroxide, sodium carbonate and potassium carbonate, corresponding to about 5% to 35% by weight of the final mixture, at a temperature between about 0° and 80° C., preferably at about 25° C. to 60° C. This results in the formation of two liquid phases, the lighter or upper phase containing substantially all the ether with only small amounts of water. The water content of the ether layer is about 10% to 15% by weight or less, being lower as the amount of alkali metal hydroxide or carbonate is increased. Substantially pure ether is then readily recovered by fractional distillation of the separated ether layer, the small content of water being removed in the more volatile fractions without the loss of any substantial amount of the ether. In contrast, the fractional distillation of ether containing substantial amounts of water results in the initial removal of water as the water-ether azeotrope and thus involves the loss of one part by weight of ether for about each four parts of water, unless further recovery treatment is applied.

The unpredictable nature of the solubility relationships which make possible the efficient process of this invention is verified by publications such as that of Kobe et al., Journal of Physical Chemistry, vol. 44, 629–633 (1940). While the cyclic di-ether, dioxane, was found to be salted out by sodium chloride and other metal chlorides and electrolytes, it was not salted out by fifteen of thirty-one electrolytes which were tested. Thus, the article states on page 632 "The theory of salting out is not well understood, and no theory has been advanced which will account for all the phenomena involved."

The above conclusion is supported by experimental observations in connection with the present invention. The above-defined ethers do not form a separate liquid phase when sodium or potassium chloride is added to aqueous solutions thereof. If an ether such as bis-(2-methoxyethyl) ether is added to concentrated brine, substantially all of the ether goes into solution and salt precipitates.

However, the combined use of an alkali metal chloride substantially saturating the aqueous ether solution and of an alkali metal hydroxide or carbonate or mixture thereof, in an amount of about 5 to 35% by weight of the final mixture, effects the separation of an insoluble ether liquid phase containing substantially less than 10% to 15% by weight of water. The obtainment of such insoluble ether layer was unpredictable as the combined use with saturated brine of about 8% by weight of other electrolytes including sodium formate, sodium acetate, ammonium chloride, ammonium sulfate, ammonium hydroxide, borax ($Na_2B_4O_7 \cdot 10H_2O$), and calcium chloride did not result in the separation of a second liquid layer. Furthermore, the obtainment of a liquid ether phase by the combined use of an alkali metal chloride and an alkali metal hydroxide and/or carbonate, which liquid has a water content of substantially less than 10% to 15% by weight is a surprising as well as advantageous phenomenon.

In a preferred embodiment of this invention, aqueous or solid alkali metal hydroxide is added to an aqueous solution of the ether, substantially saturated with an alkali metal chloride, until the final mixture contains 5–35 percent by weight of the alkali to effect the separation of a second liquid phase. Over a 96 percent by weight ether solution can be separated from the caustic solution as by siphoning or decantation after the treatment, if the upper part of this range is employed. In general, the solubility of the ether in the aqueous phase decreases as the temperature is increased. However, the separation is preferably carried out at about 25° to 60° C.

The following examples further illustrate this invention, as does the attached phase diagram in Fig. 1.

*Example I*

A solution of 53 grams of pelletized NaOH and 307 grams of $CH_3OH$ was added to 429 grams of bis-(2-chloroethyl) ether in a 2-liter, 3-necked flask, equipped with an overhead condenser. Heat was applied by means of a mantle, the temperature being raised to 73° C. in 2 hours. Beginning at the end of the first 2 hour period, 211 grams of pelletized NaOH were added to the reaction vessel in increments of 53 grams every 2 hours, except for the final increment which was 52 grams. Heating was continued for 4 hours following the addition of the last portion of NaOH. The temperature was maintained between 71° C. and 83° C. throughout the reaction time (except for the initial warm-up period of about 35 minutes) which totalled about 12 hours and 15 minutes.

Most of the excess methanol was distilled from the reaction mixture and a 300 gram portion of a 10 percent aqueous NaOH solution was added to the remaining reaction mixture with stirring to provide a mixture containing about 6.8 weight percent of sodium hydroxide. The organic phase separated as the uppermost phase and was siphoned off at a temperature of about 40° C.

The organic layer which was siphoned from the reaction mixture was completely separated from a small amount of aqueous phase in a separatory funnel to give about 380 grams of bis (2-methoxyethyl) ether product phase. This was purified by fractionation at atmospheric pressure after the addition of 100 grams of tetraline. Several fractions were recovered overhead which were:

| Cut | Grams | B.P., °C. | Substance |
|---|---|---|---|
| I | 17 | 65 | $CH_3OH$. |
| II | 57 | 82 - 85.5 | Unidentified. |
| III | 25 | 96 - 99 | Do. |
| IV | 20 | 158 -162.8 | bis-(2-methoxyethyl)ether. |
| V | 182 | 163.5-164.5 | Do. |
| VI | 55 | 164.8-165.5 | Do. |
| VII | 28 | 166 -167.3 | Unidentified. |
| Total | 384 | | |

Of the 380 grams of organic phase separated by aqueous NaOH, about 257 grams or slightly less than 2 moles were the desired product.

It is to be noted here that the final distillation separated bis-(2-methoxyethyl)ether. If the liquid phase separation of this invention had not been applied, much of the product would have been collected as a water azeotrope, as 2 moles of water are formed for each mole of the dichloroethyl ether hydrolyzed. Further treatment would have been required to isolate the product.

*Example II*

A mixture of: Grams
Beta,beta'-dichlorodiethyl ether _____ 429
Methanol _____ 307
Water _____ 36
NaOH (solid) _____ 53 was placed in a kettle fitted with a stirrer and reflux condenser. The mixture was heated to 71° C. and sodium hydroxide pellets were added every half hour. The first three additions were of 53 grams each and the final fourth addition 52 grams. After 2 hours the pot temperature had risen to about 80° C. The reaction mixture was then cooled to 50° C. and was placed in a stainless steel autoclave equipped with a stirrer. It was held there for 2 hours at 120° C. About 150 grams of methanol was removed by a brief distillation leaving a clear solution.

In order to effect a phase separation, a 250 gram portion of 50% sodium hydroxide was added to the mixture at a temperature of 50° C. After the addition of the sodium hydroxide, the two-phase mixture, saturated with sodium chloride, included approximately 269 grams of water and 149 grams of NaOH.

The upper organic phase of 316 grams, containing substantially all of the ether product, was siphoned off. It was fractionally distilled and pure diethylene glycol dimethyl ether was obtained at 56% of the theoretical yield based on the dichlorodiethyl ether used.

*Example III*

A mixture of: Grams
Ethyl alcohol _____ 1380
Beta,beta'-dichlorodiethyl ether _____ 429
NaOH (50% aqueous) _____ 528 was placed in an autoclave and the temperature was maintained at about 75° C. for about 11 hours and then at about 120° C. for 3 hours. The charge was cooled and transferred to a vessel together with 395 grams of ethanol which was used to rinse the bomb. The solid sodium chloride was removed by centrifugation and was washed with 200 grams of ethanol which were added to the centrifugate product solution. The latter was then heated and 1685 grams of ethanol were removed by distillation. The residue was treated with 90 grams of flake sodium hydroxide after which the upper organic layer of 273 grams, containing substantially all the ether product, was removed. The two-phase mixture, saturated with sodium chloride, obtained after the addition of the sodium hydroxide contained 372 grams of water and 114 grams of NaOH. Fractional distillation of the organic layer yielded 266 grams of substantially pure diethylene glycol diethyl ether.

The phase diagram in Figure 1 represents the bis-(2-methoxyethyl)ether-water-NaOH system and is typical of the systems formed by an ether as defined above, an alkali metal hydroxide or carbonate and water. Although the determinations were carried out with mixtures saturated with sodium chloride to simulate actual process conditions, the compositions are represented on a salt-free basis to simplify the diagram.

The phase diagram indicates, at point Z, that less than 1 percent NaOH is required to separate 2 liquid phases from a mixture which contains 50 percent or more ether. As this binodal curve is followed to the left, the water layer loses ether to the ether layer until at point Y the aqueous layer contains less than 1 percent ether. The conjugate phase, obtained by following the tie-line from point Y, comprises over 97 percent ether and less than 3 percent water.

Under reaction conditions which are variations of the procedure described in Example I, the reaction mixture at the time when the phases are separated from each other can contain from approximately 25 to 70 percent by weight of water, based upon the weight of the water and ether, for example, a composition close to the point Z. At equilibrium, in the presence of over 5% by weight of caustic soda in the mixture, the aqueous layer contains a small amount of the ether and the ether layer contains 10% to 15% water or less, such contents being decreased as the percentage of caustic soda in the mixture is increased. It is apparent that separation of the ether is much more simple and less costly by the procedure of this invention than would be the distillation of the 20 percent ether azeotrope, followed by isolation of the ether from the azeotrope.

I claim:

1. In the separation of a dialkyl ether of diethylene glycol, wherein the alkyl groups contain one to three carbon atoms each, from an aqueous solution thereof, the process comprising substantially saturating said solution with an alkali metal chloride, admixing a material chosen from the group consisting of alkali metal hydroxides and alkali metal carbonates in an amount corresponding to 5 to 35 percent of the total weight of said ether, water and material present in the mixture, maintaining said mixture at a temperature of about 25° C. to 60° C. whereby to effect the formation of an aqueous layer having a small content of said ether and of an ether layer having a small content of water, and separating the said layers.

2. The process of claim 1 wherein said material is sodium hydroxide and said alkali metal chloride is sodium chloride and said alkyl group is methyl.

References Cited in the file of this patent

Kobe et al.: Jour. Physical Chemistry, vol. 44 (1940), pgs. 629–633.